US012590042B2

(12) United States Patent
Honda et al.

(10) Patent No.: US 12,590,042 B2
(45) Date of Patent: Mar. 31, 2026

(54) LIQUID HUMIC ACID EXTRACT

(71) Applicant: DENKA COMPANY LIMITED, Tokyo (JP)

(72) Inventors: Kazuma Honda, Machida (JP); Taiga Sato, Sagamihara (JP); Toshiharu Ichijoh, Hanamaki (JP)

(73) Assignee: DENKA COMPANY LIMITED, Tokyo (JP)

( * ) Notice: Subject to any disclaimer, the term of this patent is extended or adjusted under 35 U.S.C. 154(b) by 903 days.

(21) Appl. No.: 17/782,552

(22) PCT Filed: Dec. 9, 2020

(86) PCT No.: PCT/JP2020/045788
§ 371 (c)(1),
(2) Date: Jun. 3, 2022

(87) PCT Pub. No.: WO2021/117755
PCT Pub. Date: Jun. 17, 2021

(65) Prior Publication Data
US 2023/0015862 A1 Jan. 19, 2023

(30) Foreign Application Priority Data
Dec. 12, 2019 (JP) ................................. 2019-224175

(51) Int. Cl.
| | |
|---|---|
| *C05F 11/02* | (2006.01) |
| *C05D 9/02* | (2006.01) |
| *C05G 1/00* | (2006.01) |
| *C05G 5/23* | (2020.01) |

(52) U.S. Cl.
CPC ................ *C05F 11/02* (2013.01); *C05D 9/02* (2013.01); *C05G 1/00* (2013.01); *C05G 5/23* (2020.02)

(58) Field of Classification Search
CPC .. C05F 11/02; C05D 9/02; C05G 1/00; C05G 5/23; C05G 5/20
See application file for complete search history.

(56) References Cited

FOREIGN PATENT DOCUMENTS

| | | |
|---|---|---|
| JP | S40-014122 B2 | 7/1965 |
| JP | S51-72987 A | 6/1976 |
| JP | S60-18565 A | 1/1985 |
| JP | 2005-089615 A | 4/2005 |
| JP | 2007-196172 A | 8/2007 |
| JP | 2017-071522 A | 4/2017 |
| JP | 2018-058721 A | 4/2018 |
| JP | 2018-095555 A | 6/2018 |
| KR | 10-2015-0001472 A | 1/2015 |

OTHER PUBLICATIONS

Akashi, et. al., Journal of Japanese Society of Soil Science and Plant Nutrition, (1975), vol. 46, No. 5, pp. 175-179.
Yamada, et. al., Journal of Japanese Society of Soil Science and Plant Nutrition, (2002), vol. 73, No. 6, pp. 777-781.
Fujitake, Humic Substances Research, (2006), vol. 3, pp. 1-9.
Mar. 9, 2021 International Search Report issued in Patent Application No. PCT/JP2020/045788.

*Primary Examiner* — Jennifer A Smith
(74) *Attorney, Agent, or Firm* — Oliff PLC

(57) ABSTRACT
A liquid humic acid extract that does not form precipitates when combined with a liquid fertilizer containing at least one of Mg, Fe, Zn and Mo and having an electric conductivity of 90 ms/cm or more. A liquid humic acid extract containing humic acid that has a mass-average molecular weight of 100 to 1,200, and having a total organic carbon concentration of 15,000 to 25,000 mg/L and a pH of 0.5 to 4.0. Preferably, the liquid humic acid extract contains a humic acid having a mass-average molecular weight of 100 to 1,200, and has a total organic carbon concentration of 15,000 to 25,000 mg/L and a pH of 0.5 to 4.0. A liquid humic acid extract that hardly forms precipitates and realizes an increase in the crop yield.

4 Claims, No Drawings

LIQUID HUMIC ACID EXTRACT

TECHNICAL FIELD

The present invention relates to a liquid humic acid extract.

BACKGROUND ART

Humic acid is a natural organic polymer existing in soil and landwater. As humic acid, there are humic acid contained in brown coal and peat coal, and natural humic acid derived from metabolites of bacterial groups or from animals and plants, and the like.

There exist many types of industrially available humic acid including humic acid produced by oxidative decomposition of low rank coal such as brown coal (PTL 1) and synthetic products such as alkali metal salts or alkaline earth metal salts of oxidatively decomposed products (PTLs 2 and 3).

Humic acid is said to be effective for growth promotion for plants (NPLs 1 and 2), and it is proposed to use humic acid for fertilizers. Also proposed is a technique of extracting humic acid for liquification (PTLs 4 and 5).

Humic acid can be grouped into humin that is an insoluble fraction, alkali-soluble and acid-insoluble humic acid, and acid-soluble fulvic acid. The difference between humic acid and fulvic acid is defined by the difference in solubility at pH 1.0 (NPL 3). In the present embodiment, both a humic acid fraction and a fulvic acid fraction that have nearly continuous characteristics are collectively expressed as humic acid.

In use for fertilizers, such humic acid is preferably combined with fertilizer components such as nitrogen, phosphorus and potassium. For using humic acid for liquid fertilizers, there are proposed an effective extraction method for humic acid (PTL 6) and a humic acid-containing liquid three-element fertilizer added with a three-element fertilizer (PTL 7). There is also proposed a material hardly causing coprecipitation with a fertilizer (PTL 8).

CITATION LIST

Patent Literature

PTL 1: JP40-14122B
PTL 2: JP51-72987A
PTL 3: JP60-18565A
PTL 4: JP2005-89615A
PTL 5: JP2007-196172A
PTL 6: JP2017-71522A
PTL 7: JP2018-58721A
PTL 8: JP2018-95555A

Non-Patent Literature

NPL 1: Akashi, et. al., Journal of Japanese Society of Soil Science and Plant Nutrition, Vol. 46, No. 5, pp. 175-179
NPL 2: Yamada, et. al., Journal of Japanese Society of Soil Science and Plant Nutrition, Vol. 73, No. 6, pp. 777-781
NPL 3: Fujitake, Humic Substances Research Vol. 3, pp. 1-9

SUMMARY OF INVENTION

Technical Problem

Recently, unlike the category of agricultural chemicals and fertilizers, a biostimulant that is a material for enhancing plant activity to thereby enhance disease resistance and environmental resistance has attracted attention. Although the mechanism of action is not fully elucidated, disease resistance and environmental resistance to high temperatures, etc. have been confirmed as phenomena.

The pH of the liquid humic acid extract of the present invention differs from that in PTL 7.

The total organic carbon concentration in the present invention differs from that in PTL 8.

Solution to Problem

The present invention is a liquid humic acid extract that hardly forms precipitates and can realize an increased crop yield. The present invention is as follows.

<1> A liquid humic acid extract that does not form precipitates when combined with a liquid fertilizer containing at least one of Mg, Fe, Zn and Mo and having an electric conductivity of 90 ms/cm or more.

<2> A liquid humic acid extract containing humic acid that has a mass-average molecular weight of 100 to 1,200, and having a total organic carbon concentration of 15,000 to 25,000 mg/L and a pH of 0.5 to 4.0.

<3> The liquid humic acid extract according to <1>, containing a humic acid that has a mass-average molecular weight of 100 to 1,200, and having a total organic carbon concentration of 15,000 to 25,000 mg/L and a pH of 0.5 to 4.0.

<4> The liquid humic acid extract according to one of <1> to <3>, diluted with water.

<5> A method for producing a liquid humic acid extract of one of <1> to <3>, including the following steps (1) to (5):

(1) A step of addling 10 to 40 parts by mass, on dry basis, of nitric acid to 20 parts by mass of low rank coal, (2) A step of reacting the mixture obtained in (1) under the condition of 70 to 95° C. for 1 to 6 hours to prepare a crude humic acid product, (3) A step of adding water and an alkali to the crude humic acid product, (4) A step of extraction under the condition of a liquid temperature of 40 to 95° C. for 0.5 to 24.0 hours, (5) A step of solid-liquid separation of the crude liquid humic acid extract obtained in (4) to give a liquid humic acid extract.

Advantageous Effects of Invention

According to the present invention, there can be provided a humic acid that hardly forms precipitates and can realize an increased crop yield.

DESCRIPTION OF EMBODIMENTS

Hereinunder embodiments of the liquid humic acid extract of the present invention are described.

Preferably, the liquid humic acid extract of the present embodiment is produced through the following steps (1) to (5).

(1) A step of adding 20 to 36 parts by mass of nitric acid to 20 parts by mass of low rank coal.

(2) A step of reacting the mixture obtained in (1) under the condition of 70 to 95° C. for 1 to 6 hours to prepare a crude humic acid product.

(3) A step of adding water and an alkali to the crude humic acid product. The step (3) is, for example, a step of adding water to the crude humic acid product so as to have a targeted solid-liquid ratio or less, and then adding an alkali so as to have a pH of 0.5 to 4.0, and further adding water so as to have a final solid-liquid ratio of 1/3 to 1/6.

(4) A step of extraction under the condition of a liquid temperature of 40 to 95° C. for 0.5 to 24.0 hours. The step (4) is, for example, a step of keeping the crude humic acid product that has been controlled to have a predetermined solid-liquid ratio, under the condition of a liquid temperature of 40 to 95° C. for 0.5 to 24.0 hours for extraction to give a crude liquid humic acid extract.

(5) A step of solid-liquid separation of the crude liquid humic acid extract obtained in (4) to give a liquid humic acid extract. The step (5) is, for example, a step of removing the unreacted residue from the crude liquid humic acid extract by centrifugation or filter pressing for solid-liquid separation to separate a liquid humic acid extract.

[Production Method for Crude Humic Acid Product]

Here, a low rank coal is a coal that has a smaller carbon content than bituminous coal or the like, and is defined to have a carbon content of 83% by mass or less. Examples of the low rank coal include peat coal, lignite, brown coal, and subbituminous coal, and one or two or more as mixed thereof are used here.

26 to 36 parts by mass of nitric acid is added to 20 parts by mass of low rank coal, and mixed at 70 to 95° C. for 1 to 6 hours to give a crude humic acid product. Here, the amount of nitric acid is in terms of 100% nitric acid (100% $HNO_3$). Nitric acid is preferably concentrated nitric acid. From the viewpoint of safety and reactivity, the concentration of nitric acid is preferably 40 to 60% by mass. As a reaction starter, the system is heated in a hot water bath at 70 to 95° C. to attain smooth reaction.

[Solid-Liquid Ratio of Liquid Humic Acid Extract]

The amount of the raw material, the extraction solvent relative to the amount of low rank coal used for preparing a crude humic acid product is defined as a solid-liquid ratio. For example, in the case where 100 g (100 mL) of a solvent (water) is added to a crude humic acid product prepared from 20 g of low rank coal, the solid-liquid ratio is 1/5.

[Production Method for Liquid Humic Acid Extract]

Preferably, water is added to the crude humic acid product, and an alkali is appropriately added thereto while measuring the pH thereof preferably so as to make the pH 0.5 to 4.0, more preferably the pH 1.0 to 3.0. The alkali includes a hydroxide and ammonia. The hydroxide includes an alkali metal hydroxide and ammonium hydroxide. The hydroxide is preferably an alkali metal hydroxide. The alkali metal hydroxide includes potassium hydroxide and sodium hydroxide. The hydroxide is preferably at least one of potassium hydroxide, sodium oxide and ammonium hydroxide (aqueous ammonia).

After pH control, water is added so as to have an intended solid-liquid ratio. Finally, the solid-liquid ratio is preferably 1/3 to 1/6, more preferably 1/4 to 1/6.

It is possible to previously carry out a test in which the amount of the alkali to be added is varied relative to the crude humic acid product so as to determine the pH of the intended liquid humic acid extract and the amount of the alkali to be added. As the alkali to be added for pH control in extraction, potassium hydroxide usable as a fertilizer component can be used, and the alkali can be appropriately selected depending on the intended use.

Using a hot water bath or the like, the above is kept for extraction under the condition of a liquid temperature of 40 to 95° C. for 0.5 to 1 hour to give a crude liquid humic acid extract. After extraction to give the crude liquid humic acid extract, the extract is cooled down to 40° C. or lower. The unreacted residue was separated from the crude liquid humic acid extract by solid-liquid separation such as centrifugation or filter pressing. The resultant supernatant liquid after the solid-liquid separation is taken as a liquid humic acid extract. The liquid humic acid extract in the present embodiment has a high solubility in water even when it is dewatered to be a powder, and therefore can be utilized after powdering by a spray drier or by freezing dry.

For preventing the liquid extract from freezing or degrading, the liquid temperature in extraction is preferably 40 to 95° C. When the extraction time is 0.5 hours or more, there is no great difference in the extraction rate of humic acid. More preferably, the extraction time is 0.5 to 24 hours.

The liquid humic acid extract having a higher concentration is more useful in transportation or in production of secondary products. However, the high-concentration extract is likely to gel due to a decrease in temperature or a decrease in pH, and therefore, the total organic carbon concentration is preferably 15,000 to 25,000 mg/L, more preferably 15,300 to 24,900 mg/L.

The liquid humic acid extract after solid-liquid separation can be controlled to have a pH around neutral, as needed, in accordance with the growth of crops. Extraction of humic acid is generally carried out in alkali having a pH of around 12, but in some cases, the solubility of humic acid may lower by controlling the extract to be around neutral. The pH in extraction of the liquid humic acid extract in the present embodiment is preferably 0.5 to 4.0, more preferably 1.0 to 3.0. With that, the extract is prepared to have a pH falling within a range within which the solubility of humic acid can increase, therefore not undergoing solubility reduction. Relative to the relationship to the solubility of extracted humic acid, the pH in extraction thereof in the extraction operation is important, and in the present embodiment, pH control to near neutral after the solid-liquid separation step is not a problem.

<Action and Effect>

The advantageous effects of the liquid humic acid extract in the present embodiment are described.

Heretofore, when a high-concentration fertilizer component having an electric conductivity of 90 ms/cm or more is mixed with humic acid, precipitates form readily, and therefore mixing in a high-concentration state has been difficult. Among the metals (metal ions) having an electric conductivity of 90 ms/cm or more in a fertilizer component, one or more of Mg, Fe, Zn and Mo readily form precipitates when combined with humic acid.

The content of Mg, Fe, Zn and Mo is as follows. The total content of Mg, Fe, Zn and Mo is preferably 1000 to 10000 mg/L, more preferably 1000 to 15000 mg/L, even more preferably 3000 to 6000 mg/L. The content of Mg is preferably 1000 to 10000 mg/L, more preferably 3000 to 6000 mg/L. The content of Fe is preferably 50 to 1000 mg/L, more preferably 150 to 500 mg/L. The content of Zn is preferably 1 to 100 mg/L, more preferably 5 to 50 mg/L. The content of Mo is preferably 0.1 to 100 mg/L, more preferably 1 to 30 mg/L.

In the present embodiment, any other fertilizer component than Mg, Fe, Zn and Mo, for example, the following fertilizer components can be contained. A preferred content is as follows.

The content of P is preferably 1000 to 10000 mg/L, more preferably 4000 to 8000 mg/L. The content of K is preferably 10000 to 100000 mg/L, more preferably 30000 to 50000 mg/L.

The content of Mn is preferably 10 to 500 mg/L, more preferably 50 to 150 mg/L. The content of B is preferably 1 to 100 mg/L, more preferably 20 to 80 mg/L. The content of Cu is preferably 0.1 to 100 mg/L, more preferably 0.5 to 10 mg/L.

A liquid fertilizer (water culture medium) for use for nutriculture (hydroponic culture) or hydroponic soil culture contains all fertilizer components of three elements (nitrogen, phosphorus, potassium), secondary elements (calcium, magnesium, sulfur), and minor elements (manganese, boron, iron, copper, zinc, molybdenum, chlorine). In general, regarding the use of a liquid fertilizer, a concentrated solution thereof is sent and applied while diluted with water to about 100 times. In the case where the liquid humic acid extract in the present embodiment is used as a liquid fertilizer, it can be mixed with a concentrated fertilizer, and accordingly existing institutions can be utilized with no need of any new tank, therefore attaining labor savings in operation.

The liquid humic acid extract in the present embodiment hardly forms precipitates even when combined with a fertilizer component. The liquid humic acid extract in the present embodiment hardly forms precipitates even when the fertilizer component combined has a high concentration and has an electric conductivity of 90 ms/cm or more. The liquid humic acid extract in the present embodiment hardly forms precipitates even when combined with a fertilizer component containing at least one of metals (metal ions) of Mg, Fe, Zn and Mo having an electric conductivity of 90 ms/cm or more.

The liquid humic acid extract produced through the above-mentioned steps makes it possible to be combined with a liquid fertilizer that has not been able to be mixed in a concentrated state with no precipitate formation, and therefore can provide a humic acid-containing liquid fertilizer for nutriculture. The liquid humic acid extract produced through the above-mentioned steps is free from precipitate formation, and therefore can evade trouble in agricultural production. By adding humic acid to a water culture medium of inorganic ions alone, the buffering ability of the water culture medium can be improved therefore giving useful effects in agricultural production owing to the activity effect for crops.

EXAMPLES

Hereinunder the present invention is described specifically with reference to Examples, but the present invention is not restricted by these Examples.

[pH Measurement]

A pH was measured according to a glass electrode method. A suspension (crude extract liquid of humic acid) containing residues of a crude humic acid product was stirred with a magnetic stirrer to measure the pH thereof.

[Mass-Average Molecular Weight)

The mass-average molecular weight of humic acid was measured according to an HPSEC method (GPC method) using Alliance HPLC System by Waters Corporation. As a column, SB-803HQ by Showa Denko KK was used, as a standard sample, sodium polystyrenesulfonate was used, and the detection wavelength was 260 nm. The mobile phase was 25 mass % acetonitrile-containing 10 mmol/L sodium phosphate, the flow rate was 0.8 ml/min, and the column temperature was 40° C. (column oven set value).

[Total Organic Carbon Concentration]

The total organic carbon concentration (hereinafter referred to as TOC) of a humic acid solution is a value measured according to a combustion catalyst oxidation system using a total organic carbon meter (TOC-L by Shimadzu Corporation). As compared with a complicated humic acid quantification method (e.g., International Humic Substances Society Method, see NPL 3), TOC that can be quantified in a simplified manner is taken as an index in the present embodiment. There is a strong correlation between TOC and the amount of humic acid determined according to a humic acid quantification method. Depending on the kind of the brown coal used as a raw material, the humic acid amount is presumed to be 1.4 to 1.8 times TOC.

[Validation of Precipitates]

For validation, OAT House No. 1, a fertilizer for nutriculture by OAT Agrio Co., Ltd. was used as a representative example of a liquid fertilizer.

The constituent components of OAT House No. 1 were determined by ICP emission spectrometry in accordance with the fertilizers test method (2019) of the Food and Agricultural Materials Inspection Center, Incorporated Administrative Agency of Japan. The results are shown in Table 1.

In accordance with the fertilizers test method (2019) of the Food and Agricultural Materials Inspection Center, Incorporated Administrative Agency of Japan, and using an electric conductivity meter ES-71 (by HORIBA, Ltd.), the electric conductivity of OAT House No. 1 was measured. The electric conductivity was 93 ms/cm.

TABLE 1

| | Constituent Component | | | | | | | | |
| | P | K | Mg | Mn | B | Fe | Cu | Zn | Mo |
|---|---|---|---|---|---|---|---|---|---|
| Content (mg/L) | 6200 | 40000 | 4400 | 150 | 50 | 280 | 3.3 | 9.2 | 3.2 |

150 g of OAT House No. 1 was dissolved in about 800 ml of water, and a liquid humic acid extract was added thereto so as to have TOC of 1,000 mg/L, and stirred. Water was added to the liquid mixture (hereinafter referred to as a mixed liquid fertilizer) so as to have a constant volume of 1000 mL, and in a 1000-mL size measuring cylinder, this was statically left under the condition of 20° C. for 24 hours or 30 days.

From the volume of the precipitates formed after left to stand, the precipitation in the mixed liquid fertilizer was expressed as a precipitation rate (precipitation volume (mL) ÷1000 (mL))×100(%)). In the present embodiment, no precipitation formation means that, in the case where a precipitation rate can be measured, the precipitation rate is less than 0.1%, preferably the precipitation rate after left to stand for 24 hours is less than 0.1%. In the present embodiment, more preferably, the precipitation rate after left to stand for 24 hours is less than 0.1% and in addition thereto, the precipitation rate after left to stand for 30 days is also less than 0.1%.

OAT House No. 2 and liquid fertilizers for nutriculture by other companies (by DAN Chemical Co., Ltd., Sumitomo Chemical Co., Ltd.) were investigated, but there was not seen any significant difference in the precipitation rate value between them, and therefore OAT House No. 1 was used as a representative example.

Example 1

In a draft, 20 g of brown coal having a carbon content of 77% by mass was put in a 500-ml beaker, and 41.7 g of nitric acid having a concentration of 48% by mass (20 parts by mass of 100% nitric acid relative to 20 parts by mass of low rank coal) was added thereto. In a water bath at 80° C., this was subjected to oxidation reaction for 3 hours. The crude humic acid product obtained through the operation was subjected to the following extraction.

About 80 ml of water was added to the crude humic acid product, and 8.5 g of potassium hydroxide was added thereto and stirred. With monitoring with a pH meter, an aqueous solution of 1.0 mol/L potassium hydroxide was appropriately added with stirring to make the pH 3.0. Water was added so as to have a constant volume of 100 ml as a whole (the solid/liquid ratio became 1/5 ), and this was extracted at 80° C. for 1 hour.

The crude liquid extract was made 40° C. or lower, then the volatile moisture was supplemented to make the total volume 100 ml, and this was centrifuged at 3,500×g for 20 minutes. The resultant liquid humic acid extract was appropriately diluted, and according to the above-mentioned measurement methods, the mass-average molecular weight, TOC and the precipitation rate thereof were measured. The results are shown in Table 2.

Example 2

This is the same as Example 1, except that 75.0 g of nitric acid having a concentration of 48% by mass (36 parts by mass of 100% nitric acid relative to 20 parts by mass of low rank coal) was added for oxidation reaction, and that in extraction, 12.5 g of potassium hydroxide was added and, with monitoring with a pH meter, an aqueous solution of 1.0 mol/L potassium hydroxide was used to make the pH 3.0.

Example 3

This is the same as Example 1, except that in extraction, 8.3 g of potassium hydroxide was added and, with monitoring with a pH meter, an aqueous solution of 1.0 mol/L potassium hydroxide was used to make the pH 1.0.

Example 4

This is the same as Example 1, except that in extraction, 8.6 g of sodium hydroxide was added and, with monitoring with a pH meter, an aqueous solution of 1.0 mol/L sodium hydroxide was appropriately added to make the pH 3.0.

Example 5

This is the same as Example 1, except that in extraction, about 60 ml of water was added and 14.0 g of 25% aqueous ammonia was added and stirred, and, with monitoring with a pH meter, 1.0 mol/L aqueous ammonia was appropriately added to make the pH 3.0.

Example 6

This is the same as Example 1, except that in extraction, 0.2 g of potassium hydroxide was added and, with monitoring with a pH meter, an aqueous solution of 1.0 mol/L potassium hydroxide was used to make the pH 0.6.

Example 7

This is the same as Example 1, except that in extraction, 12.3 g of potassium hydroxide was added and, with monitoring with a pH meter, an aqueous solution of 1.0 mol/L potassium hydroxide was used to make the pH 4.0.

Comparative Example 1

This is the same as Example 1, except that 25.0 g of nitric acid having a concentration of 48% by mass (12 parts by mass of 100% nitric acid relative to 20 parts by mass of low rank coal) was added for oxidation reaction to give a crude humic acid product, that about 180 ml of water and 3.6 g of potassium hydroxide were added to the crude humic acid product, and, with monitoring with a pH meter, an aqueous solution of 1.0 mol/L potassium hydroxide was used to make the pH 6.5, and that water was added to make a constant volume of 200 ml as a whole (solid-liquid ratio became 1/10).

Comparative Example 2

This is the same as Example 1, except that 37.5 g of nitric acid having a concentration of 48% by mass (18 parts by mass of 100% nitric acid relative to 20 parts by mass of low rank coal) was added for oxidation reaction, and 8.0 g of potassium hydroxide was added in extraction, and that, with monitoring with a pH meter, an aqueous solution of 1.0 mol/L potassium hydroxide was used to make the pH 3.0.

Comparative Example 3

This is the same as Example 1, except that 83.0 g of nitric acid having a concentration of 48% by mass (40 parts by mass of 100% nitric acid relative to 20 parts by mass of low rank coal) was added for oxidation reaction, and 15.5 g of potassium hydroxide was added in extraction, and that, with monitoring with a pH meter, an aqueous solution of 1.0 mol/L potassium hydroxide was used to make the pH 3.0.

Comparative Example 4

This is the same as Example 1, except that about 40 ml of water was added to the crude humic acid product, and 8.5 g of potassium hydroxide was added thereto and stirred, and that, with monitoring with a pH meter, an aqueous solution of 1.0 mol/L potassium hydroxide was appropriately added while stirring to make the pH 3.0, and water was added to make a constant volume of 50 ml as a whole (solid-liquid ratio became 1/2.5).

Comparative Example 5

This is the same as Example 1, except that about 180 ml of water was added to the crude humic acid product, and 8.5 g of potassium hydroxide was added thereto and stirred, and that, with monitoring with a pH meter, an aqueous solution of 1.0 mol/L potassium hydroxide was appropriately added while stirring to make the pH 3.0, and water was added to make a constant volume of 200 ml as a whole (solid-liquid ratio became 1/10).

Comparative Example 6

This is the same as Example 1, except that 4.1 g of magnesium hydroxide was added in extraction and that, with monitoring with a pH meter, a 1.0 mol/L magnesium hydroxide slurry was appropriately added to make the pH 3.0.

TABLE 2

| | pH | Mass-Average Molecular Weight | Total Organic Carbon Amount*1 (mg/L) | Precipitation Rate (%) after 24 hours | after 30 days |
|---|---|---|---|---|---|
| Example 1 | 3.0 | 1,100 | 21,000 | 0.1> | 0.1> |
| Example 2 | 3.0 | 150 | 24,800 | 0.1> | 0.1> |
| Example 3 | 1.0 | 600 | 15,500 | 0.1> | 0.1> |
| Example 4 | 3.0 | 780 | 17,800 | 0.1> | 0.1> |
| Example 5 | 3.0 | 1,000 | 19,200 | 0.1> | 0.1> |
| Example 6 | 0.6 | 520 | 10,000 | 0.1> | 0.1> |
| Example 7 | 4.0 | 870 | 28,000 | 0.1> | 2.5 |
| Comparative Example 1 | 6.5 | 3,400 | 40,000 | 5 | 6 |
| Comparative Example 2 | 3.0 | 1,250 | 12,000 | 2 | 2.5 |
| Comparative Example 3 | 3.0 | 110 | 12,000 | 0.5 | 1 |
| Comparative Example 4 | 3.0 | measurement impossible | measurement impossible | measurement impossible | measurement impossible |
| Comparative Example 5 | 3.0 | 1,700 | 10,000 | 1.5 | 2 |
| Comparative Example 6 | 3.0 | 1,300 | 28,000 | 2 | 3 |

*1The total organic carbon amount means a total organic carbon concentration.

As shown by the results in Table 2, in Example 1 and Example 2, the extraction was from the targeted crude humic acid product, and the data satisfied the mass-average molecular weight and TOC. In the case of using the liquid humic acid extract of Example 1 and Example 2, the precipitation rate of the mixed liquid fertilizer prepared by adding the liquid humic acid extract to a 100-fold concentrated liquid of OAT House No. 1 was low.

In Comparative Example 1, humic acid was prepared in the same manner as that for a conventional humic acid proposed in PTL 1. In Comparative Example 1, a high-concentration liquid humic acid extract could be prepared, but when formed into a mixed liquid fertilizer, the resultant fertilizer immediately precipitated and gelled.

Comparative Example 2 and Comparative Example 3 were designed by varying the amount of nitric acid to be added. In Comparative Example 2, the mass-average molecular weight was large, the extraction rate at pH 3.0 lowered, and TOC lowered. In Comparative Example 3, weight-average molecular weight was low, and TOC was small. These are presumed to be because excessive decomposition occurred since the amount of nitric acid added was large and therefore the formed humic acid was further decomposed.

In Comparative Example 3, the precipitation rate of the mixed liquid fertilizer also lowered. This is considered to be because of the influence of the remaining nitric acid in addition to the properties of the humic acid.

In Example 6, the same crude humic acid product as in Example 1 was used, but the pH in extraction was changed to 0.6. In the case of using the liquid humic acid extract of Example 6, the precipitation rate of the mixed liquid fertilizer prepared by adding the extract to a 100-fold concentrated liquid of OAT House No. 1 was low. However, in Example 6, the mass-average molecular weight was within the intended range, but TOC lowered. This would be because the humic acid fraction to be extracted at pH of 1.0 or more was not eluted.

In Example 7, the same crude humic acid product as in Example 1 was used, but the pH in extraction was changed to 4.0. In the case of using the liquid humic acid extract of Example 7, the precipitation rate of the mixed liquid fertilizer prepared by adding the extract to a 100-fold concentrated liquid of OAT House No. 1 was low after left to stand for 24 hours. However, in Example 7, though a liquid extract having a high TOC was obtained, the mass-average molecular weight thereof was high. In Example 7, the precipitation rate of the mixed liquid fertilizer after left to stand for 30 days increased.

Comparative Example 4 and Comparative Example 5 are investigation results of a solid-liquid ratio in extraction. In Comparative Example 4, the solvent amount was small and a high-concentration humic acid gelled, and therefore centrifugation was impossible for production. In Comparative Example 5, TOC was not satisfied. In Comparative Example 5, the solvent amount was large so that the solubility of humic acid increased, and accordingly, a humic acid having a higher molecular weight was extracted, and consequently, the mass-average molecular weight was somewhat large and the solubility of the mixed liquid fertilizer lowered.

In Example 4, Example 5 and Comparative Example 6, the alkali species in pH control was investigated. In Comparative Example 6, a liquid extract having a high TOC was obtained, but the mass-average molecular weight thereof was high. In Comparative Example 6, the solubility in a concentrated liquid fertilizer lowered. Regarding these, the precipitates were qualitatively analyzed, and magnesium was detected therein. Therefore, the reason is considered because magnesium would be a contributory factor of precipitation formation. In preparing the liquid humic acid extract in the present embodiment, it is important to select the alkali species.

From the above, the intended liquid humic acid extract is prepared first by adding 20 to 36 parts by mass of nitric acid to 20 parts by mass of low rank coal to oxidize the coal with nitric acid to give a crude humic acid product. This is for the purpose of increasing the humic acid extraction rate to further lower the molecular weight of the humic acid contained in the extract. Next, the pH in humic acid extraction is controlled to be preferably 0.5 to 4.0, more preferably 1.0 to 3.0 so as to selectively extract a humic acid having a lower molecular weight and having a higher solubility. Controlling the solid-liquid ratio in extraction is necessary for obtaining a high-concentration liquid humic acid extract, and the solid-liquid ratio is preferably 1/4 to 1/6. The liquid humic acid extract produced by controlling the solid-liquid ratio in extraction can have a low precipitation rate when it is made into a mixed liquid fertilizer.

[Cultivation Test]

Next, for confirming the agricultural usefulness of the resultant liquid humic acid extract, a cultivation test was carried out using a liquid fertilizer for nutriculture. Curly lettuce (variety: Furiru Ice, by Snow Brand Seed Co., Ltd.) was used as a test plant, and a nutriculture apparatus "Neoplantar Mini" by Sanshin Metal Working Co., Ltd. was used to carry out nutriculture (hydroponic culture), and the mass of the aboveground part of the cultivated plant was measured. The results are shown in Table 3.

Seeds were previously germinated on a urethane foam, and the resultant seedlings in a three-leaves stage were planted in a panel made of a styrol foam, and cultivated under the condition of a 12-hours day-length (with the apparatus-attendant LED lighting) at 22° C. (room temperature) for 38 days. For cultivation, referred to was the operating manual of "Neoplantar Mini".

Example 8

105 g of OAT House No. 1 was dissolved in about 600 ml of water, and the liquid humic acid extract of Example 1 was added thereto for 21-fold dilution, and stirred. Water was added to the mixed liquid fertilizer to have a constant volume of 700 ml, thereby preparing a concentrated liquid of OAT House No. 1. Separately, 70 g of OAT House No. 2 was dissolved in about 600 ml of water, and further diluted with water to be 700 ml, thereby preparing a concentrated liquid of OAT House No. 2.

The total amount of the concentrated liquid of humic acid-containing OAT House No. 1, and the total amount of the concentrated liquid of OAT House No. 2 were put into the nutriculture apparatus while diluted by 100 times. The total amount of the concentrated liquid was 70 L. For the liquid fertilizer for nutriculture, OAT House No. 1 and OAT House No. 2 were used as a mixture thereof. The liquid fertilizer for nutriculture is a standard A formulation recommended by OAT Agrio Co., Ltd., and the humic acid concentration therein was 10 mg/L as TOC.

Comparative Example 7

This is the same as Example 8, except that OAT House No. 1 added with nitrate nitrogen and potassium equivalent to the liquid humic acid extract was prepared in place of the liquid humic acid extract added in Example 8.

Example 9

This is the same as Example 8, except that the liquid humic acid extract of Example 6 was used in place of the liquid humic acid extract of Example 1.

TABLE 3

| | Mass of Aboveground Part (g) |
| --- | --- |
| Example 8 | 108.1 ± 3.48 |
| Comparative Example 7 | 89.2 ± 2.55 |
| Example 9 | 94.0 ± 3.22 |

As shown by the results in Table 3, in the cultivation test where the liquid humic acid extract of Example 8 was added, the yield amount of curly lettuce was higher than in Com-parative Example 7. The yield increase shows the increase in the growing speed and brings about shortening of the growth time. The yield increase shortens the yield cycle in year-round cultivation in plant factories and others, and is therefore considered to contribute toward further increase in annual harvest of plants.

In the cultivation test where the liquid humic acid extract of Example 9 was added, the yield of curly lettuce was higher than in Comparative Example 7. However, when the liquid humic acid extract of Example 6 having a smaller TOC than in Example 1 was used, the yield (Example 9) was smaller than in Example 8. From these, it is known that the pH of the liquid humic acid extract is preferably further controlled to fall between 1.0 and 3.0.

In Example 8 and Example 9, there occurred no problem of formation of precipitates of humic acid and fertilizer components, pump clogging, and the like, during the cultivation period. In the present embodiment, any problem in agricultural production, such as precipitate formation owing to liquid humic acid extract addition, was not recognized. From the above, the liquid humic acid extract in the present embodiment is a material useful for agricultural production.

INDUSTRIAL APPLICABILITY

Humic acid has agricultural advantages of promoting the growth of crops and the like. The liquid humic acid extract of the present embodiment hardly forms precipitates even when added to a liquid fertilizer in a concentrated state containing three elements, mass components and minor elements. The humic acid of the present embodiment can be readily homogenized at the time of dilution, and forms no precipitates in the case of using in nutriculture or the like, and therefore can evade troubles such as clogging of supply lines. The present embodiment enables mixing in a concentration tank, and therefore does not need extension of any additional tanks, and is applicable to existing facilities. The present embodiment improves the buffer capacity of a solution culture medium merely by adding humic acid to the solution culture medium of inorganic ions alone. The present embodiment provides advantageous effects in agricultural production owing to the activity effect for crops. The liquid humic acid extract of the present embodiment can be obtained by extraction from a crude humic acid product prepared by oxidation by nitric acid of adding 20 to 36 parts by mass of nitric acid to 20 parts by mass of low rank coal, under the condition of pH 0.5 to 4.0 and a solid-liquid ratio of 1/3 to 1/6.

The present embodiment can be used in nutriculture, etc. In PTL 7, in the case of using a liquid humic acid extract alone, or in the case of mixing a diluted liquid fertilizer (low-concentration fertilizer components) and a liquid humic acid extract, humic acid precipitates do not form. The liquid humic acid extract of the present embodiment can be mixed with fertilizer components in a concentrated state (high concentration). The present embodiment can provide a humic acid that hardly forms precipitates even when mixed with a liquid fertilizer in a concentrated state. Consequently, for a liquid fertilizer for nutriculture added with humic acid, nutriculture and hydroponic soil culture can be carried out using existing plants as they are.

The humic acid of the present embodiment provides advantageous effects in agricultural production. The present embodiment can improve the buffer capacity of a solution culture medium by adding humic acid to the solution culture medium of inorganic ions alone. The present embodiment has an activity effect for crops and therefore can realize an increase in the yield of crops, and therefore provides advantageous effects in agricultural production.

The present embodiment can be used in nutriculture with fertilizer components combined with an effective humic acid. The present embodiment can provide a liquid fertilizer containing a humic acid for hydroponic soil culture. In the present embodiment, even when the liquid humic acid extract in a concentrated state is mixed with a liquid fertilizer, no precipitates form. Consequently, it is unnecessary to dilute a mixture of a humic acid and a liquid fertilizer, by connecting a liquid fertilizer mixing device or the like to a supply line.

In the present embodiment, when a liquid humic acid extract in a concentrated state is mixed with a liquid fertilizer and after the mixture is left to stand for 1 month, no precipitates form. Consequently, it is unnecessary to use the entire amount immediately after mixing, and long-term storage is possible.

The invention claimed is:

1. A liquid humic acid extract containing a humic acid that has a mass-average molecular weight of 100 to 1,200, and having a total organic carbon concentration of 21,000 to 24,900 mg/L and a pH of 1.0 to 3.0.

2. A liquid humic acid extract that does not form precipitates when combined with a liquid fertilizer containing at least one of Mg, Fe, Zn and Mo and having an electric conductivity of 90 ms/cm or more, wherein the liquid humic acid extract contains a humic acid having a mass-average molecular weight of 100 to 1,200, and has a total organic carbon concentration of 21,000 to 24,900 mg/L and a pH of 1.0 to 3.0.

3. The liquid humic acid extract according to claim 1, diluted with water.

4. A method for producing a liquid humic acid extract according to claim 1, comprising the following steps (1) to (5):

(1) A step of adding 20 to 36 parts by mass of nitric acid to 20 parts by mass of low rank coal, (2) A step of reacting the mixture obtained in (1) under the condition of 70 to 95° C. for 1 to 6 hours to prepare a crude humic acid product, (3) A step of adding water and an alkali to the crude humic acid product, (4) A step of extraction under the condition of a liquid temperature of 40 to 95° C. for 0.5 to 24.0 hours, (5) A step of solid-liquid separation of the extract obtained in (4) to give a liquid humic acid extract.

* * * * *